Dec. 9, 1941.　　　　I. COWLES　　　　2,265,267
SEPARABLE SWIVEL CONNECTION FOR CONDUITS
Filed March 8, 1939　　　　2 Sheets-Sheet 1

Inventor:
Irving Cowles,
By: Rudolph /illegible/
Attorney

Dec. 9, 1941.  I. COWLES  2,265,267
SEPARABLE SWIVEL CONNECTION FOR CONDUITS
Filed March 8, 1939  2 Sheets-Sheet 2
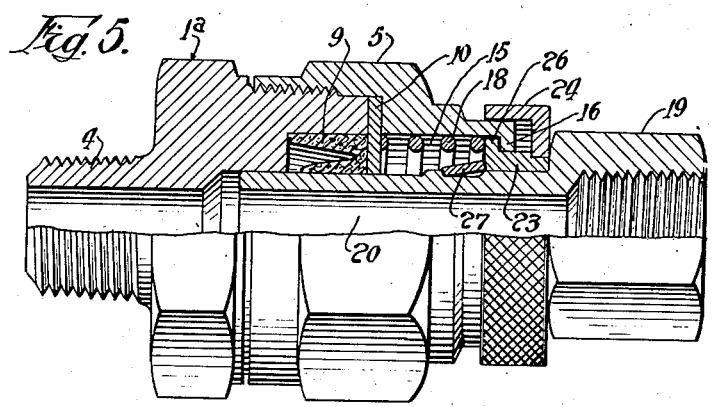
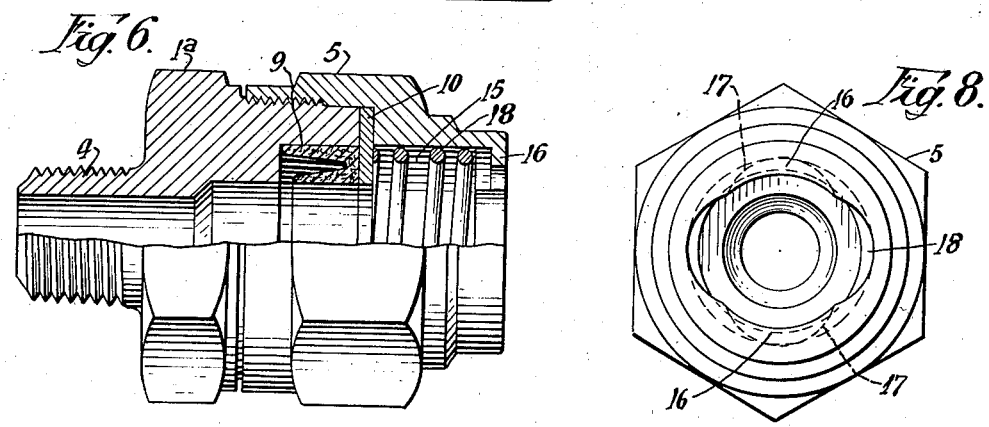
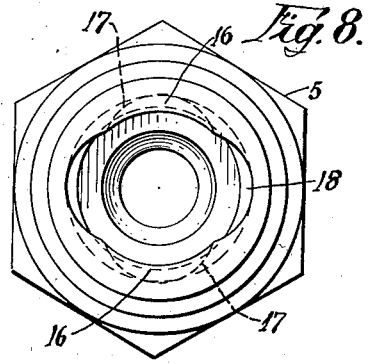
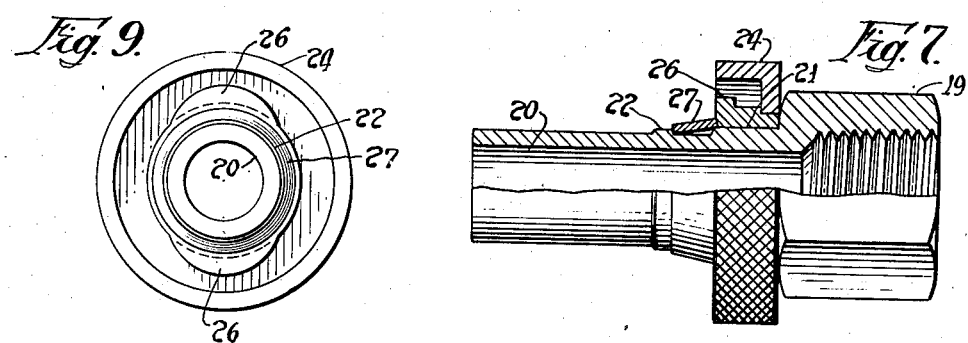
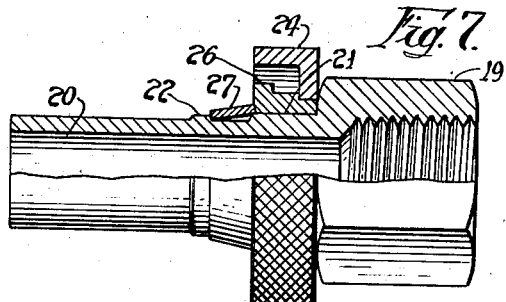
Inventor:
Irving Cowles,
By: Rudolph M. Lotz
Attorney.

Patented Dec. 9, 1941

2,265,267

UNITED STATES PATENT OFFICE 2,265,267

SEPARABLE SWIVEL CONNECTION FOR CONDUITS

Irving Cowles, Detroit, Mich., assignor to said Cowles and Rudolph W. Lotz, Chicago, Ill., as successor cotrustees of Utility Patents Trust Application March 8, 1939, Serial No. 260,476

2 Claims. (Cl. 284—19)

The invention relates to the general class of couplings commonly styled "quick-detachable couplings" which are adapted to be interposed between a source of supply of fluid under pressure and a conduit from which the same is discharged and has for its main object to provide a structure wherein the portion or member with which the discharge conduit is adapted to be connected is rotatable relatively to that portion which is adapted to be connected with the source of supply.

A further object of the invention is to provide a simple and efficient means whereby a fluid tight joint is maintained between the said rotatable member and the said other member without materially resisting rotation of said rotatable member.

Another object of the invention is to provide a very simple and efficient means for coupling the separable parts of the structure against relative rotation, which parts are so located as not to interfere with the compactness of the structure or to sacrifice the structural advantages thereof.

Other objects of the invention are pointed out in and will be readily understood from the following description.

Suitable embodiments of the invention are illustrated in the accompanying drawings, wherein:

Fig. 5 is a view similar to Fig. 1 showing the coupling devoid of the self-closing valve of Fig. 1.

Fig. 6 is a fragmentary sectional view similar to Fig. 5 showing the body portion of the structure alone.

Fig. 7 is a view partly in elevation and partly in central longitudinal section, of the cap element of the structure of Fig. 6.

Fig. 8 is an end elevation of the structure of Fig. 6 looking at the right hand end of the latter.

Fig. 9 is an end elevation looking at the left hand end of Fig. 7.

Figure 1:
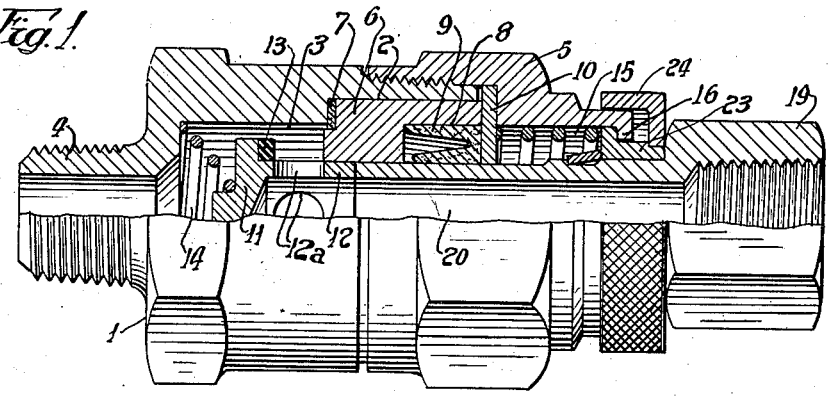
Fig. 1 is a side elevation partly in central longitudinal section of a separable swivel connection constructed in accordance with the invention, showing the same fully assembled, as in use.
Figure 2:
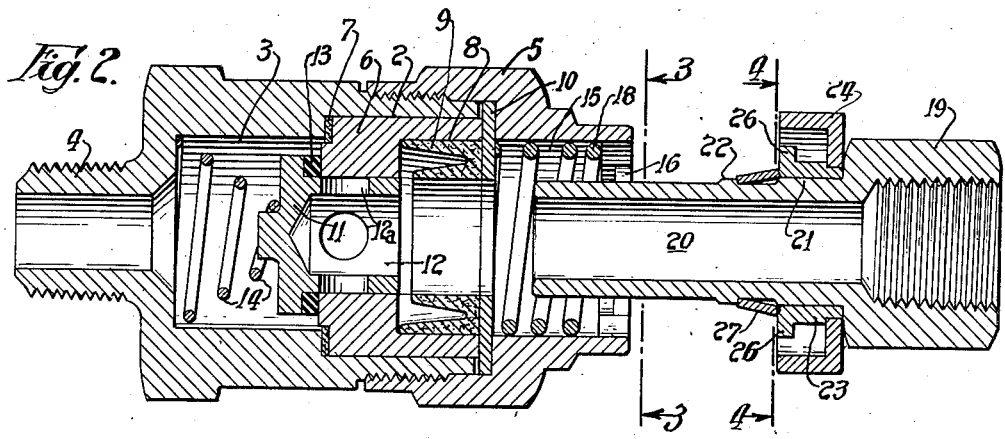
Fig. 2 is a central, longitudinal view of the structure showing the component separable elements thereof spaced from each other.
Figure 3:
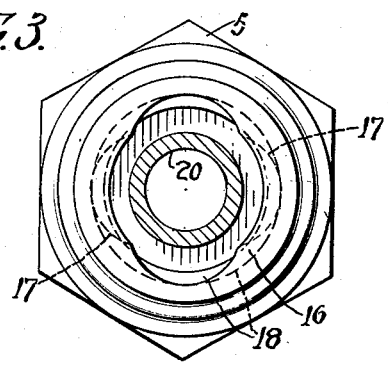
Fig. 3 and Fig. 4 are transverse, sectional views taken, respectively, on the lines 3—3 and 4—4 of Fig. 2.
Figure 4:
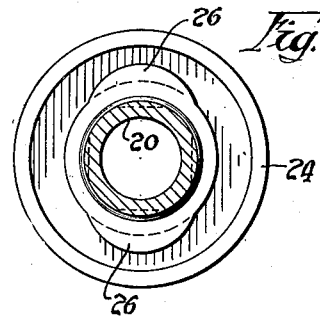

The structure of Figs. 1 to 4 comprises a body member 1 having a large diameter bore portion 2 and a smaller diameter bore portion 3, both concentric with the bore of the nipple 4, said last-named bore being usually the same as that of the conduit port with which the member 1 is connected.

The portion of the body member 1 equipped with bore 2 is threaded externally for connection with a companion body member 5, said members 1 and 5 being equipped with hexagonal surface portions for engagement with wrenches or the like.

Disposed telescopically within the bore portion 2 is a sleeve 6 equipped with an annular recess for a gasket 7 which seats upon the annular shoulder between the bore portions 2 and 3, said sleeve being also equipped with an internal annular recess 8 containing a rubber gasket 9, substantially V-shaped in cross section, having concentric annular legs, or flanges, the inner one of which is shorter than the outer, the outer cylindrical surface of the inner flange being aligned with the smaller bore of the sleeve 6 and spaced therefrom.

A metallic washer 10 is interposed between the outer end of said sleeve 6 and an annular shoulder of the body member 5, the central opening of said washer being of the same diameter as the smaller bore of said sleeve 6 and concentric therewith.

A valve 11 of larger diameter than the smaller bore of the sleeve 10 is equipped with a hollow stem 12 engaging telescopically in said smaller bore portion of the sleeve 6 and is of substantially the same length as the said bore. Said valve 11 carries a gasket 13 which is maintained normally seated on the opposed end of the sleeve 6 responsively to the action of the compression spring 14 interposed between the said valve 11 and the end wall of the body member 1.

The hollow stem 12 of said valve 11 is provided with radial openings 12a for the passage of fluid when the valve 11 is moved against the action of the spring 14.

It will be noted that the discharge end portion of the casing member 5 has a cylindrical bore 15 and an end wall 16 provided with a substantially elliptical central opening. The side walls of said opening are spaced from the inner wall or bore 15 of said member. As illustrated, the opening comprises two opposed co-axial arcuate wall portions and two opposed smaller diameter arcuate wall portions. The axes of the latter are spaced equidistantly from the aforesaid axis, the three axes being disposed in a common plate.

The smaller diameter end portions of said opening meet, or substantially meet, the last-named bore 15. The portions of the end wall 16 lying between the central part of said opening and the said bore are provided in their inner faces with arcuate recesses 17 corresponding in radius with the smaller diameter end portions of said openings and have their axes similarly spaced from the first-named axis and disposed in a plane of the latter extending at right angle to the first-named plane. Thus the machining of the said end wall is rendered very simple in that the entire opening may be punched through said end wall 16 and said recess 17 then milled out in a well-known manner.

The washer 10 provides a seat for a compression spring 18, the outer end of which bridges the smaller diameter end of said end wall opening and also bridges the recesses 17.

A coupling head 19 equipped with a tubular stem 20 of the same diameter as the stem 12 of valve 11, is provided for cooperation with said stem 12 to open the valve 11. The stem 20 is of slightly larger diameter adjacent the head 19, as shown at 21, than the other end or main portion of said stem, the latter being also equipped with a shallow annular flange 22 spaced from said portion 21.

Rotatably mounted upon the portion 21 is a collar 23 and a ring member 24. The latter is equipped with an annular inwardly projecting flange 25 which is disposed between the head 19 and an annular shoulder of the collar 23.

The collar 23 is of a diameter for snugly fitting telescopically the central portion of the opening in the end wall 16. At the end of the collar 23 opposed to the flange 22 are two diametrically opposed crescent shaped flanges 26 which are adapted to pass telescopically through the smaller diameter end portion of said opening and to be received in said recesses 17.

Interposed between the collar 23 and the flange 22 is a tapered sleeve 27 which cooperates with the head 19 to hold the collar 23 against longitudinal movement.

The ring member 24 is adapted to receive telescopically the outer end portion of the casing member 5.

The collar 23 and ring member 24 are easily produced by punch and drawing press operations, the said shoulder of said collar supporting the ring member 24 being formed by a lathe operation. The sleeve 27 consists of an initially cylindrical sleeve which is passed telescopically over the flange 22 and is then tapered by a very simple operation.

Obviously the head 19 is coupled with the member 5 by forcing the collar 23 and its flanges 26 through the opening in the wall 16 against the action of spring 18 and then turning said collar through an arc of 90 degrees and releasing hand pressure thereon to allow spring 18 to force flanges 26 into the recesses 17, said collar being then held against rotation. The ring member 24 is rendered rigid with collar 23 by means of drive fit for obvious reasons.

When the head 19 is thus coupled with the member 5 the stem 20 is positioned as in Fig. 1 to cause fluid to flow through the same.

The structure of Figs. 1-4 is more particularly designed for high pressure conditions wherein the self-closing valve 12 is necessary to prevent injury to operators while separating the head 23 and stem 20 from the body members 5 while the member 1 remains connected with a source of fluid under high pressure.

The spring 18 may be omitted and a stronger spring 14 employed if desired, in instances of low fluid pressure uses of the structure, but the use of two springs shown is far preferable.

Leakage of fluid through any possible point of escape from the meeting ends of the stems 12 and 20 around the valve stem 12 will cause its flow into the hollow of the gasket 9 and thus force the shorter flange of said gasket to be compressed against the stem 20 to eliminate escape of such fluid from the device otherwise than through the stem 20.

The structure of Figs. 5 to 9 inclusive, eliminates the valve 12, spring 14 and sleeve 6. In all other respects said structure coincides with that of Figs. 1-4 inclusive, and is adapted for use in instances where the conduit connected with the body member 1a is equipped with a control valve and the conduit connected with the head is commonly equipped with a manually operable nozzle to control discharge of fluid under pressure.

The main advantage of the structure of Figs. 1-4 lies in the fact that fluid from the source with which the body member 1 is connected, enters first the chamber containing spring 14 and flows readily through the openings of the valve-stem as soon as the valve 11 is opened. This assures a flow of fluid through stem 20 of same volume as is admitted to said spring chamber, as the inner diameter of valve stem 12 and stem 20 is the same as that of the bore of the nipple 2.

I claim as my invention:

1. A coupling comprising in combination, a casing having an intake valve chamber in one end and a spring chamber in its other end, a duct connecting said chambers, there being an annular recess between the ends of said duct, a gasket mounted in said recess, the portion of said duct between said recess and spring chamber being cylindrical, a reciprocable normally closed valve in said valve chamber equipped with a stem slidable in the adjacent portion of said duct and spaced from said recess, a cylindrical discharge tube adapted to be telescopically and rotatably disposed in the cylindrical portion of said duct and through said gasket, a collar mounted for rotation upon said tube and against longitudinal movement thereon, a compression spring in said spring chamber disposed out of engagement with said duct and out of direct engageable relation to said tube and cooperating means on said collar and casing interengageable to hold said collar non-rotatably engaged with said casing and against movement away therefrom and maintaining said means on said collar engaged with said spring to hold the said cooperating means interengaged, said tube being engaged with said valve stem to maintain said valve open when said collar is disposed in said last-named position.

2. A coupling comprising in combination, a casing having an intake chamber at one end and a spring chamber in its other end, a duct disposed axially of said casing and connecting said chambers, a portion of said duct opening into said spring chamber being cylindrical, a gasket mounted against longitudinal movement at the other end of said cylindrical duct portion, a removable cylindrical discharge tube, connectible with a flexible conduit, adapted to be telescopically and rotatably engaged in said duct and with said gasket, a collar mounted for rotation and against longitudinal movement upon said tube, a compression spring in said spring chamber disposed out of engaging relation to said duct and out of direct engageable relation to said tube and engageable with said collar, and co-operating means on said collar and casing interengageable to hold said collar yieldably engaged against rotation with respect to said casing under the influence of said spring, said gasket maintaining a fluid tight joint between said tube and said duct.

IRVING COWLES.